United States Patent
Namgung et al.

(10) Patent No.: US 10,055,101 B2
(45) Date of Patent: Aug. 21, 2018

(54) MOBILE TERMINAL ACCEPTING WRITTEN COMMANDS VIA A TOUCH INPUT

(71) Applicant: LG ELECTRONICS INC., Seoul (KR)

(72) Inventors: Seol Namgung, Seoul (KR); Jieun Lee, Seoul (KR); Sungyoung Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 14/246,967

(22) Filed: Apr. 7, 2014

(65) Prior Publication Data

US 2015/0058789 A1  Feb. 26, 2015

(30) Foreign Application Priority Data

Aug. 23, 2013 (KR) .......................... 10-2013-0100555

(51) Int. Cl.
*G06F 3/00* (2006.01)
*G06F 3/0484* (2013.01)
*G06F 3/0488* (2013.01)

(52) U.S. Cl.
CPC .......... *G06F 3/0484* (2013.01); *G06F 3/0488* (2013.01)

(58) Field of Classification Search
CPC ....................................... G06F 3/0481–3/0489
See application file for complete search history.

(56) References Cited

U.S. PATENT DOCUMENTS

| | | | | |
|---|---|---|---|---|
| 5,500,937 A * | 3/1996 | Thompson-Rohrlich | | G06F 3/04883 345/173 |
| 5,644,628 A * | 7/1997 | Schwarzer | ............. | G06K 9/222 178/18.01 |
| 5,651,107 A * | 7/1997 | Frank | .................... | G06F 3/0481 345/589 |
| 5,805,163 A * | 9/1998 | Bagnas | ................. | G06F 3/0481 715/768 |
| 6,408,091 B1 * | 6/2002 | Sakaguchi | .......... | G06F 3/04883 382/187 |
| 6,476,834 B1 * | 11/2002 | Doval | ................... | G06F 9/4443 715/826 |
| 6,956,562 B1 * | 10/2005 | O'Hara | ............... | G06F 3/04883 345/173 |
| 7,004,394 B2 * | 2/2006 | Kim | ....................... | G06F 1/1616 235/439 |
| 7,429,993 B2 * | 9/2008 | Hui | ....................... | G06F 3/0481 345/592 |
| 7,499,033 B2 * | 3/2009 | Wilde | ................. | G06F 3/04883 345/173 |

(Continued)

*Primary Examiner* — Steven B Theriault
(74) *Attorney, Agent, or Firm* — Dentons US LLP

(57) ABSTRACT

The present disclosure provides a mobile terminal which includes a display unit that is configured to output screen information, a sensing unit that is configured to sense a touch input applied by a pen unit onto the display unit, and a controller that is configured to output an input window for receiving a user input when a touch input of a specific pattern is applied to a graphic object within the screen information, and process a content input through the input window regarding the graphic object, wherein at least part of the screen information is continuously output such that the user can recognize the screen information even when the input window is output.

13 Claims, 16 Drawing Sheets

(56) References Cited

U.S. PATENT DOCUMENTS

| | | | | |
|---|---|---|---|---|
| 7,904,823 B2* | 3/2011 | Beauchamp | G06F 3/0481 | 715/768 |
| 7,904,837 B2* | 3/2011 | Wakai | G06F 3/04883 | 715/253 |
| 8,196,055 B2* | 6/2012 | Zotov | G06F 3/04883 | 715/764 |
| 8,271,908 B2* | 9/2012 | Li | G06F 3/0482 | 345/173 |
| 8,296,681 B2* | 10/2012 | Nurmi | G06F 3/0482 | 715/810 |
| 8,423,916 B2* | 4/2013 | Chihara | G06F 3/04883 | 345/156 |
| 8,627,235 B2* | 1/2014 | Chang | G06F 3/04883 | 345/173 |
| 8,640,046 B1* | 1/2014 | Jania | | 715/781 |
| 8,799,798 B2* | 8/2014 | Ito | G06F 3/04883 | 715/764 |
| 8,819,597 B2* | 8/2014 | Li | G06F 3/0482 | 715/263 |
| 8,893,056 B2* | 11/2014 | Jung | G06F 3/0481 | 715/700 |
| 8,943,092 B2* | 1/2015 | Dai | G06F 17/30477 | 382/113 |
| 8,948,819 B2* | 2/2015 | Yun | G06F 3/04883 | 345/173 |
| 8,954,894 B2* | 2/2015 | Lorenz | G06F 3/0486 | 345/179 |
| 9,021,402 B1* | 4/2015 | Li | G06F 3/0416 | 715/863 |
| 9,047,508 B2* | 6/2015 | St. Jacques | G06K 9/00422 | |
| 9,075,828 B2* | 7/2015 | Yun | G06F 17/30247 | |
| 9,110,587 B2* | 8/2015 | Kim | G06F 3/04883 | |
| 9,182,905 B2* | 11/2015 | Lee | G06F 3/04883 | |
| 9,417,789 B2* | 8/2016 | Lee | G06F 3/0484 | |
| 9,448,722 B2* | 9/2016 | Yuan | G06F 3/04883 | |
| 9,575,655 B2* | 2/2017 | Rytivaara | G06F 1/1626 | |
| 2003/0014615 A1* | 1/2003 | Lynggaard | G06F 3/0321 | 712/220 |
| 2003/0071850 A1* | 4/2003 | Geidl | G06F 3/0481 | 715/781 |
| 2003/0093419 A1* | 5/2003 | Bangalore | G01C 21/3664 | |
| 2004/0145574 A1* | 7/2004 | Xin | G06F 3/0488 | 345/173 |
| 2004/0240739 A1* | 12/2004 | Chang | G06F 3/04883 | 382/186 |
| 2005/0022130 A1* | 1/2005 | Fabritius | G06F 3/038 | 715/739 |
| 2005/0165839 A1* | 7/2005 | Madan | G06F 17/242 | |
| 2005/0275638 A1* | 12/2005 | Kolmykov-Zotov | G06F 3/04883 | 345/179 |
| 2006/0059432 A1* | 3/2006 | Bells | G06F 3/0481 | 715/768 |
| 2006/0242607 A1* | 10/2006 | Hudson | G06F 3/04817 | 715/863 |
| 2007/0098263 A1* | 5/2007 | Furukawa | G06F 3/03545 | 382/181 |
| 2007/0177804 A1* | 8/2007 | Elias | G06F 3/04883 | 382/188 |
| 2008/0104020 A1* | 5/2008 | Kato | G06K 9/00402 | |
| 2008/0235621 A1* | 9/2008 | Boillot | G06F 3/017 | 715/810 |
| 2008/0250012 A1* | 10/2008 | Hinckley | G06F 17/30864 | |
| 2009/0063967 A1* | 3/2009 | Lee | G06F 3/038 | 715/702 |
| 2010/0169841 A1* | 7/2010 | Singh | G06F 17/30967 | 715/863 |
| 2010/0262905 A1* | 10/2010 | Li | G06F 3/0482 | 715/702 |
| 2010/0311470 A1* | 12/2010 | Seo | G06F 3/04883 | 455/566 |
| 2011/0041102 A1* | 2/2011 | Kim | G06F 3/0488 | 715/863 |
| 2011/0066984 A1* | 3/2011 | Li | G06F 3/04883 | 715/863 |
| 2012/0062549 A1* | 3/2012 | Woo | G06F 3/04815 | 345/419 |
| 2012/0071208 A1* | 3/2012 | Lee | H04M 1/72544 | 455/566 |
| 2012/0159364 A1* | 6/2012 | Hyun | G06F 3/0481 | 715/766 |
| 2012/0284789 A1* | 11/2012 | Kim | G06F 1/1694 | 726/19 |
| 2012/0306927 A1* | 12/2012 | Lee | G06F 3/041 | 345/660 |
| 2013/0103712 A1* | 4/2013 | Li | G06F 3/04883 | 707/769 |
| 2013/0187866 A1* | 7/2013 | Kim | G06F 3/0488 | 345/173 |
| 2013/0283144 A1* | 10/2013 | Roh | G06F 17/241 | 715/230 |
| 2013/0283199 A1* | 10/2013 | Selig | G06F 3/0484 | 715/781 |
| 2013/0311920 A1* | 11/2013 | Koo | G06F 3/04883 | 715/765 |
| 2013/0321314 A1* | 12/2013 | Oh | G06F 3/04883 | 345/173 |
| 2014/0019905 A1* | 1/2014 | Kim | G06F 3/0481 | 715/780 |
| 2014/0033136 A1* | 1/2014 | St. Clair | G06F 3/017 | 715/863 |
| 2014/0123003 A1* | 5/2014 | Song | G06F 1/1626 | 715/701 |
| 2014/0189507 A1* | 7/2014 | Valente | G06F 3/04845 | 715/705 |
| 2014/0258926 A1* | 9/2014 | Min | G06F 3/0482 | 715/808 |
| 2014/0372896 A1* | 12/2014 | Raman | G06F 3/0488 | 715/741 |

\* cited by examiner

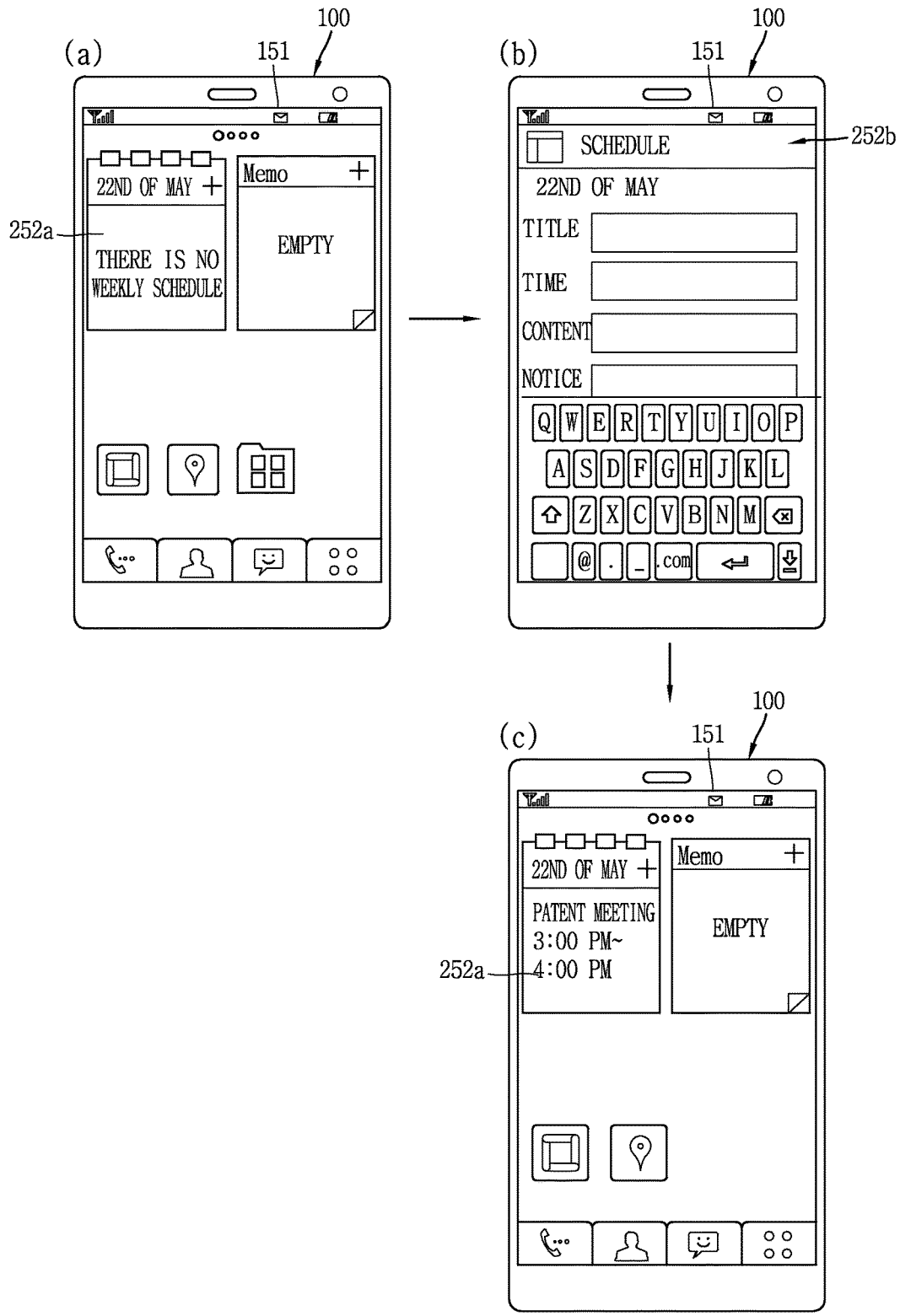

MOBILE TERMINAL ACCEPTING WRITTEN COMMANDS VIA A TOUCH INPUT

CROSS-REFERENCE TO RELATED APPLICATION

Pursuant to 35 U.S.C. § 119(a), this application claims the benefit of earlier filing date and right of priority to Korean Application No. 10-2013-0100555, filed on Aug. 23, 2013, the contents of which is incorporated by reference herein in its entirety.

BACKGROUND OF THE DISCLOSURE

1. Field of the Disclosure

This specification relates to a mobile terminal, and particularly, to mobile terminal capable of sensing a touch input made by a pen unit and a control method thereof.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal. For example, a user interface environment is provided in order for users to easily and conveniently retrieve or select functions.

Also, many users have their portable terminals to express their own personalities, and accordingly, various design factors are required for the portable terminals. The design factors may include structural changes and improvements for users to use the mobile terminal more conveniently.

With the improvement, the user can generate an input signal using a touch sensor disposed on a display unit.

SUMMARY OF THE DISCLOSURE

Therefore, an aspect of the detailed description is to provide a mobile terminal capable of supporting a new type of user input.

Another aspect of the detailed description is to provide a mobile terminal, which is capable of generating an input signal without an execution of an application or capable of simply responding to an event.

To achieve these and other advantages and in accordance with the purpose of this specification, as embodied and broadly described herein, there is provided a mobile terminal including a display unit that is configured to output screen information, a sensing unit that is configured to sense a touch input applied by a pen unit onto the display unit, and a controller that is configured to output an input window for receiving a user input when a touch input of a specific pattern is applied to a graphic object within the screen information, and process a content input through the input window regarding the graphic object, wherein at least part of the screen information may be continuously output such that the user can recognize the screen information even when the input window is output.

In accordance with one exemplary embodiment of the detailed description, the content that is input through the input window may be communicated to an application associated with the graphic object.

The at least part of the screen information may form a background of the input window. The input window may disappear and the input content may be stored in the application when a control command indicating the completion of the user input is applied while the input window is output. The control command may be applied by a tapping operation of consecutively tapping the display unit.

The controller may recognize the input content and convert the input content into information related to the input content to display on the graphic object.

In accordance with another exemplary embodiment of the detailed description, the touch input of the specific pattern may be an input that the pen unit is moved on a plane outputting the screen information. The specific pattern may be set by the user. An application associated with the graphic object may be executed when a touch input of a pattern different from the specific pattern is applied to the graphic object.

In accordance with another exemplary embodiment of the detailed description, the content input through the input window may be processed differently according to a type of the graphic object to which the touch input is applied.

In accordance with another exemplary embodiment of the detailed description, the graphic object may be one of graphic objects output within the screen information. An input window, manipulated by the user to input a content to be communicated to each application associated with a plurality of graphic objects, may be output when the touch input of the specific pattern is applied to the plurality of graphic objects among the graphic objects.

The content input through the input window may be stored in the applications as information related to the same event. The information related to the same event may include a captured image of the input window.

In accordance with another exemplary embodiment of the detailed description, the input window may disappear and an execution screen of at least one of the applications may be output when a control command indicating the completion of the user input is applied while the input window is output. The execution screen of the at least one application may display information indicating the content input through the input window.

In accordance with another exemplary embodiment of the detailed description, the graphic object may be a notification window associated with a received message, and the content input through the input window may be transmitted in response to the message. The graphic object may be output on the display unit in response to a touch input applied to an icon output on display unit.

In accordance with another exemplary embodiment of the detailed description, the graphic object may be displayed on a lock screen output in a lock mode. The input window may disappear and the lock screen may be output when a control command indicating the completion of the user input is applied while the input window is output. The graphic object may be a notification image displayed on the lock screen when a message is received, and the content input through the input window may be transmitted in response to the message.

In accordance with another exemplary embodiment of the detailed description, when at least part of the content input through the input window is information related to contact information, the at least part of the screen information which is continuously output may be transmitted to the contact information, in response to a control command indicating the completion of the user input being applied. The at least part of the screen information which is continuously output may be stored together with the content input through the input window.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 2A and 2B are conceptual views illustrating operations implemented by the present disclosure;

DETAILED DESCRIPTION OF THE DISCLOSURE

Description will now be given in detail of a mobile terminal according to the exemplary embodiments disclosed herein, with reference to the accompanying drawings. A suffix "module" and "unit" used for constituent elements disclosed in the following description is merely intended for easy description of the specification, and the suffix itself does not give any special meaning or function.

Mobile terminals described herein may include cellular phones, smart phones, laptop computers, digital broadcasting terminals, personal digital assistants (PDAs), portable multimedia players (PMPs), navigators, and the like.

Figure 1:
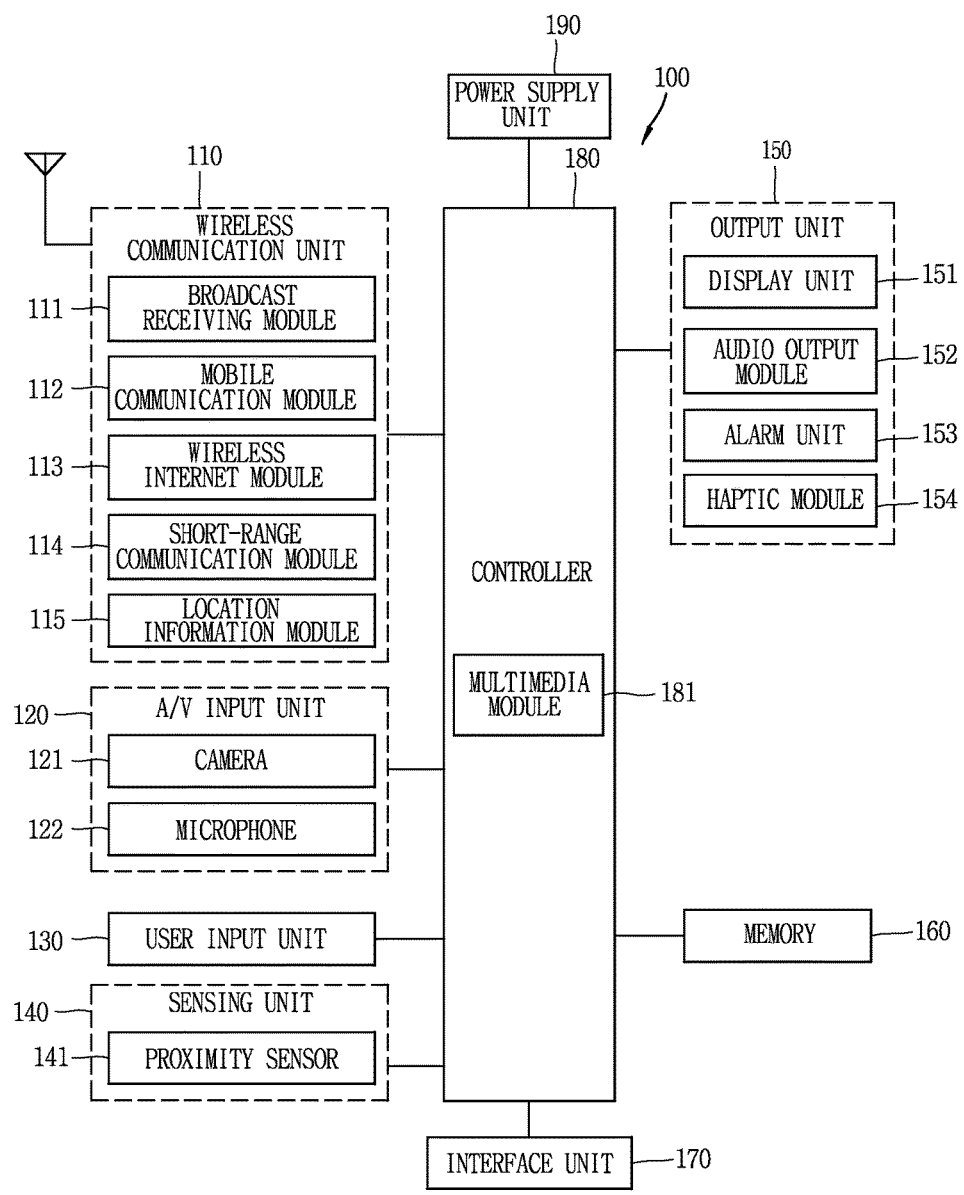
FIG. 1 is a block diagram of a mobile terminal in accordance with one exemplary embodiment.

FIG. 1 is a block diagram of a mobile terminal in accordance with one exemplary embodiment.

The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal having various components, but it may be understood that implementing all of the illustrated components is not a requirement. Greater or fewer components may alternatively be implemented.

Hereinafter, each component will be described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 may receive a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of the broadcast associated information may include information associated with a broadcast channel, a broadcast program, a broadcast service provider, or the like. The broadcast associated information may also be provided via a mobile communication network, and, in this case, received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111, for example, may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 may transmit/receive wireless signals to/from at least one of network entities, for example, a base station, an external mobile terminal, a server, and the like, on a mobile communication network. Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. Examples of such wireless Internet access may include Wireless LAN (WLAN), Wireless Fidelity (Wi-Fi) Direct, Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLU- ETOOTH™, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the mobile terminal. An example of the location information module 115 may include a Global Position System (GPS) module or a WiFi module.

Still referring to FIG. 1, the A/V input unit 120 may be configured to provide an audio or video signal input to the mobile terminal. The A/V input unit 120 may include a camera 121 and a microphone 122. The camera 121 may receive and process image frames of still pictures or video obtained by image sensors in a video call mode or a capture mode. The processed image frames may be displayed on a display unit 151.

The image frames processed by the camera 121 may be stored in the memory 160 or transmitted to an external device via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal may then be processed into digital data. The processed digital data may be converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate data input by a user to control the operation of the mobile terminal. The user input unit 130 may include a keypad, a dome switch, a touchpad (e.g., static pressure/capacitance), a jog wheel, a jog switch and the like.

The sensing unit 140 may provide status measurements of various aspects of the mobile terminal. For instance, the sensing unit 140 may detect an open/close status of the mobile terminal 100, a location of the mobile terminal 100, a presence or absence of user contact with the mobile terminal 100, an orientation of the mobile terminal 100, acceleration/deceleration of the mobile terminal 100, and the like, so as to generate a sensing signal for controlling the operation of the mobile terminal 100. For example, regarding a slide phone type mobile terminal, the sensing unit 140 may sense whether the slide phone type mobile terminal is open or closed. Other examples may include sensing statuses, the presence or absence of power provided by the power supply 190, the presence or absence of a coupling or other connection between the interface unit 170 and an external device, and the like.

The output unit 150 may be configured to output an audio signal, a video signal or a tactile signal. The output unit 150 may include a display unit 151, an audio output module 152, an alarm unit 153, a haptic module 154.

The display unit 151 may output information processed in the mobile terminal 100. For example, when the mobile terminal is operating in a phone call mode, the display unit 151 may provide a User Interface (UI) or a Graphic User Interface (GUI), which includes information associated with the call. As another example, if the mobile terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, and the like.

Some of such displays may be implemented as a transparent type or an optical transparent type through which the interior of the terminal body is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the mobile terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor may sense proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible output signals related to a particular function (e.g., a call signal reception sound, a message reception sound, etc.) performed by the mobile terminal 100. The audio output module 152 may include a receiver, a speaker, a buzzer or the like.

The alarm unit 153 may output a signal for informing about an occurrence of an event of the mobile terminal 100. Events generated in the mobile terminal, for example, may include call signal reception, message reception, key signal inputs, a touch input, etc. In addition to video or audio signals, the alarm unit 153 may output signals in a different manner, for example, using vibration to inform of an occurrence of an event. The video or audio signals may also be output via the display unit 151 and the audio output module 152. Hence, the display unit 151 and the audio output module 152 may be classified as parts of the alarm unit 153.

A haptic module 154 may generate various tactile effects the that user may feel. A typical example of the tactile effect generated by the haptic module 154 is vibration. Strength, pattern and the like of the vibration generated by the haptic module 154 may be controllable by a user selection or setting of the controller. For example, different vibrations may be combined to be outputted or sequentially outputted.

Besides vibration, the haptic module 154 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 154 may be implemented to allow the user to feel a tactile effect through a muscle sensation such as the user's fingers or arm, as well as transferring the tactile effect through a direct contact. Two or more haptic modules 154 may be provided according to the configuration of the mobile terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 may serve as an interface with every external device connected with the mobile terminal 100. For example, the interface unit 170 may receive data transmitted from an external device, receive power to transfer to each element within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The mobile terminal 100 described above may be configured to sense a touch input by a pen unit (300). The pen unit may be a stylus pen which can apply a touch input onto a touch screen, a wireless pen which transmits and receives wireless signals to and from the mobile terminal, and the like. The wireless signal may be transmitted and received using ultrasonic waves, magnetic fields, infrared rays and the like.

Also, when a touch input of a specific pattern is applied by the pen unit to a graphic object within screen information, an input window may be output for user convenience. Hereinafter, it will be described in more detail.

Figure 2B:
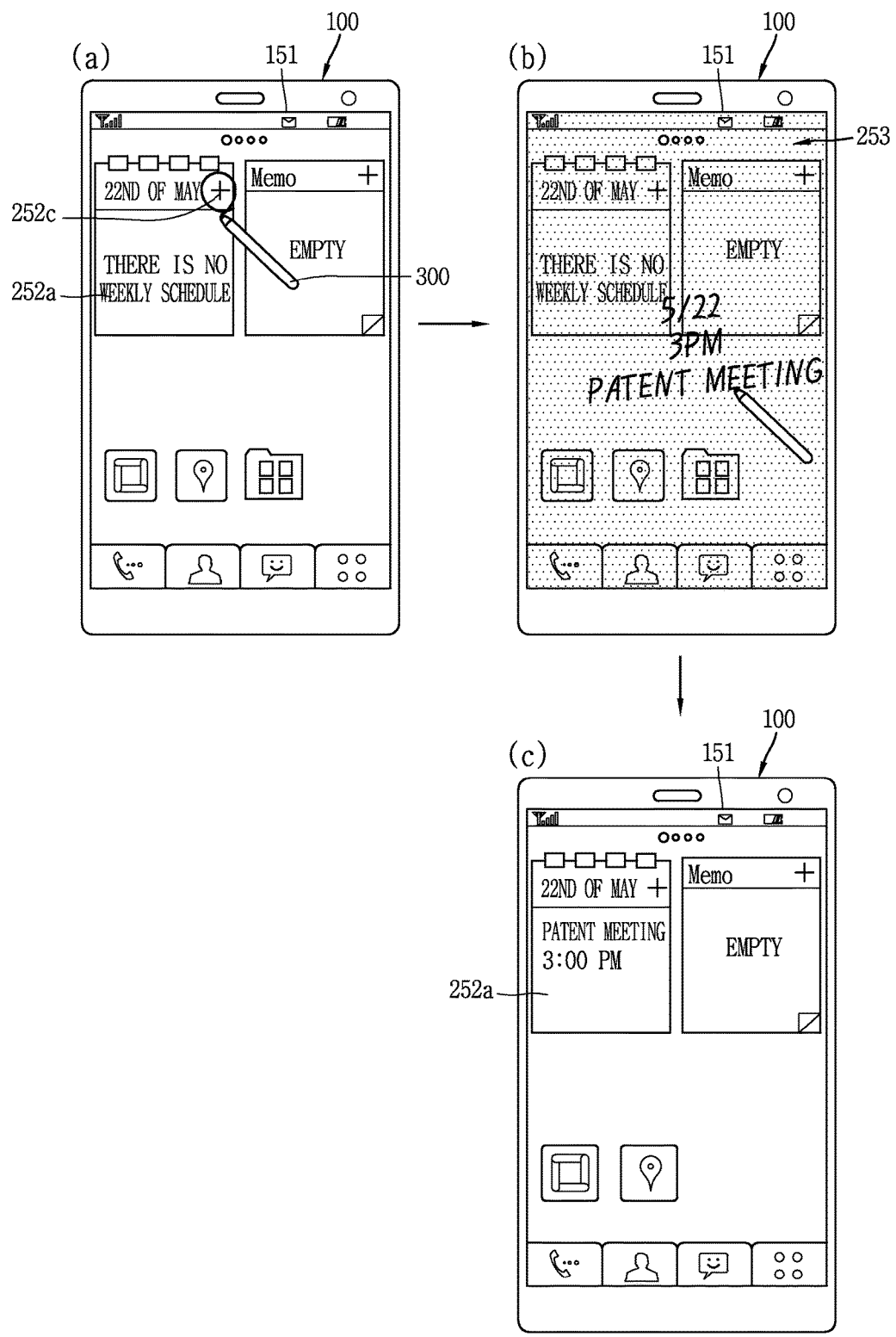

FIGS. 2A and 2B are conceptual views illustrating operations implemented by the present disclosure.

As illustrated in FIGS. 2A and 2B, a terminal may include a display unit 151 on one surface of a terminal body, for example, on a front surface. The display unit 151 may include a touch sensor for sensing a touch input. Screen information output on the display unit 151 may include various types of graphic objects, and in this case, the graphic object may be implemented in a form of image, text, icon and the like.

Referring to FIGS. 2A and 2B, according to this example, it may be enabled to simply input text while a home screen page is output on the display unit 151.

Here, the home screen page may also be expressed as an idle screen. The home screen page may also be output on the display unit 151 in an idle state of the terminal. In more detail, on the home screen page may be output icons of applications installed in the mobile terminal, folders stored with the icons, widget icons, and the like. Here, those icons or folders may be an example of the graphic object.

In this manner, when a touch input is applied onto the widget icon on the home screen page, an execution screen of a corresponding service may be output such that the corresponding service can be immediately used without opening a web browser. Here, the touch input may be applied by a pen unit.

Referring to FIG. 2A, when the pen unit applies a touch input, such as a short touch or a long touch, to an icon 252a of a calendar widget, an execution screen 252b for inputting schedules to the calendar may be output on the display unit 151. As the widget is activated, the home screen page may be converted into the execution screen 252b which may thus occupy the overall display unit 151. A user may be allowed to record a schedule on the calendar by inputting a desired content on each item of the execution screen 252b.

For example, when the user inputs (or stores after inputting) a date ($22^{nd}$ of May), a time (3:00 pm) and a title (Patent meeting), the input date, time and title may be displayed on the icon 252a of the calendar widget.

The present disclosure also proposes a function which allows for briefly inputting a content without executing a widget in a mobile terminal, in addition to the function illustrated in FIG. 2A. Referring to FIG. 2B, when the pen unit (300) applies a touch input of a specific pattern to the icon 252a of the calendar widget, an input window 253 for receiving a user input may be output. Here, in order for the user to input a content onto the input window 253 in a writing manner, the display unit 151 may be configured to allow for writing by touch inputs.

The specific pattern may be a gesture of drawing a circle. An initial gesture may be set as the user wants. After the gesture of drawing the circle is set to the specific pattern, when the user draws the circle on a portion where the user wants to input information, the screen may be frozen and changed into an inputtable window.

In more detail, the widget icon 252a may be a calendar image in a form of list view, and an indicator 252c indicating an addition of a schedule may be output on a partial region of the widget icon 252a. When the touch input of the specific pattern is applied to the indicator 252c, an input window for adding the schedule may be output. However, the present disclosure may not be limited to this, but applicable to an embodiment in which the input window is output even when the touch input of the specific pattern is applied to another region of the calendar image.

In this case, even though the input window 253 is output, at least part of the screen information may be continuously output such that the user can identify the screen information through the input window 253. That is, the screen information may be understood when viewed through the input window 253.

As an example, the at least part of the screen information may form a background of the input window 253. In more detail, a screen shot with respect to the home screen page output on the display unit 151 may be executed and a memo may be written directly on the screen shot. Also, the screen shot may be a screen which changes in shade in response to the screen information being frozen. The user may thusly freely write desired information on the frozen screen using the pen unit.

As another example, in response to the output of the input window 253, the home screen page of the display unit 151 may be converted into a write mode (or an activation of a quick memo application). In the write mode, the input window 253 may overlap the screen information, as a different layer from the screen information (namely, the home screen page in this example) which has been output prior to the execution of the input window 253, or output transparently. Accordingly, the input window 253 may provide an effect as if the user is writing on the screen information. That is, as soon as the transparent input window 253 of the new layer is popped up in response to the touch input of the specific pattern, the home screen page may be changed into the write mode (namely, the quick memo may be executed).

In this manner, a control command for outputting the input window 253 may be executed by a separate hot key, but the present disclosure may allow the touch input of the specific pattern to serve as the hot key, without use of such separate hot key.

Next, the controller may process a content (information, data) input through the input window 253 regarding the graphic object.

For example, when a control command indicating the completion of the user input is applied while the input window is output, the input window may disappear (be invisible) and the input content may be reflected in the graphic object.

In more detail, when the control command is input, an initial state (the output state of the home screen page) may be restored, and the content input on the input window may be displayed on the graphic object. For example, when a date ($22^{nd}$ of May), a time (3:00 pm) and a title (Patent meeting) are input in a writing manner (or stored after input), the input date, time and title may be displayed on the icon 252a of the calendar widget. Here, the present disclosure may not be limited to this, but the input item may alternatively include only one of the date, the time, and the title, or include only other items such as a place and the like.

Also, the control command indicating the completion of the user input may be applied by a different pattern from the specific pattern corresponding to the output command of the input window. As one example, the control command may be applied by an operation of continuously tapping the display unit.

In this manner, the present disclosure may provide a user interface allowing a user to simply perform a desired task without executing a widget. The user interface may also be applicable to applications or various functions of the terminal as well as the widget. Hereinafter, description will be given of hardware configuration of the terminal and then given of another exemplary embodiment of the user interface in more detail.

Figure 3A:
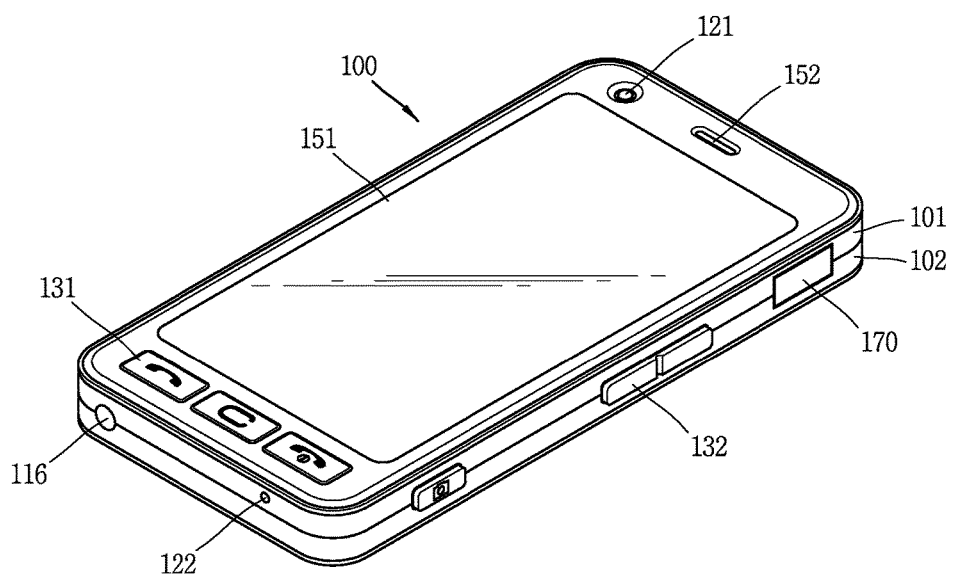
FIG. 3A is a front perspective view illustrating one example of a mobile terminal in accordance with the present disclosure.
Figure 3B:
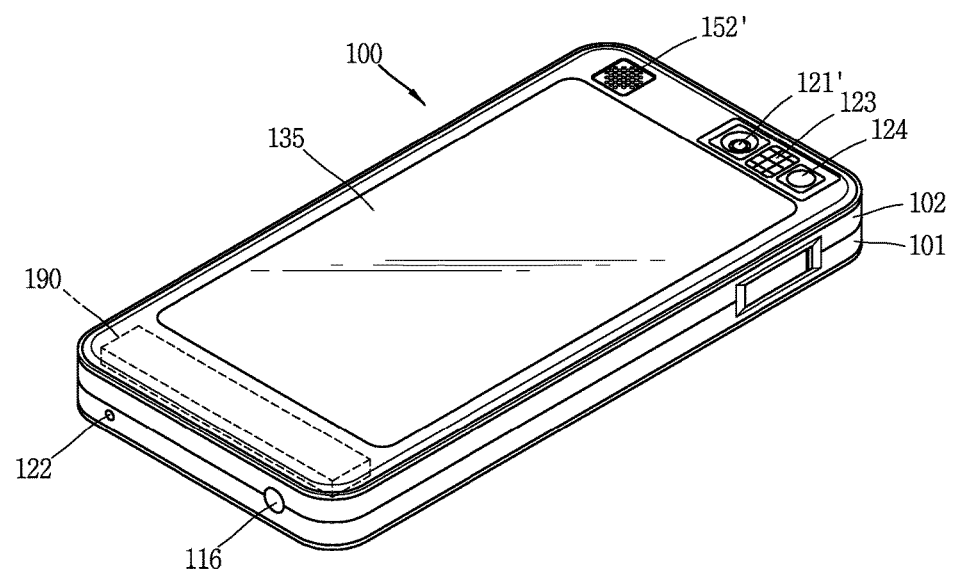
FIG. 3B is a rear perspective view of the mobile terminal illustrated in FIG. 3A.

First, the hardware configuration of the terminal executing operations of FIGS. 3A and 3B will be described. FIG. 3A is a front perspective view illustrating one example of a mobile terminal in accordance with the present disclosure, and FIG. 3B are rear perspective view of the mobile terminal illustrated in FIG. 3A.

The mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner.

The body may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102.

The cases may be formed by injection-molding synthetic resin or may be formed of a metal, for example, stainless steel (STS), titanium (Ti), or the like.

A display unit 151, an audio output module 152, a camera module 121 and the like may be disposed on a front surface of the terminal body, and an interface unit (not shown) and the like may be provided on lateral surfaces thereof.

The display unit 151 may occupy a most portion of the principal surface of the front case 101. That is, the display unit 151 may be disposed on a front surface of the terminal, and display visual information. the audio output module 152 and the camera module 121 may be disposed on a region adjacent to one of both end portions of the display unit 151, and a front input unit 131 and a microphone 122 may be disposed on a region adjacent to the other end portion.

The front input unit 131 may be an example of the user input unit 130 (see FIG. 1), and include a plurality of manipulating units. The manipulating portions may be referred to as a manipulating portion. Such manipulating portion can employ any tactile manner that a user can touch or tap for manipulation. In this exemplary embodiment, the front input unit 131 may be configured as a touch key. Also, the display unit 141 may configure a touch screen together with a touch sensor. Here, the touch screen may be a user input unit. This may allow the front surface of the terminal to from a form factor without a push key below the touch screen. Here, the present disclosure may not be limited to this. The front input unit 131 may alternatively be formed by including only a push key or any front input unit may not be configured on the front surface of the terminal.

Referring to FIG. 3B, the rear case of the terminal body may further be provided with a camera 121'. The camera 121' faces a direction which is opposite to a direction faced by the camera 121 (see FIG. 3A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash may operate in conjunction with the camera 121' when taking a picture using the camera 121'. The mirror can cooperate with the camera 121' to allow a user to photograph himself in a self-portrait mode.

An audio output module 152' may further be disposed at a rear face of the terminal body, namely, the rear case. The audio output module can cooperate with the audio output module 152 (see FIG. 3A) to provide stereo output. Also, the audio output module may be configured to operate as a speakerphone.

A power supply unit 190 for supplying power to the mobile terminal may be mounted in the terminal body. The power supply unit 190 may be mounted in the terminal body or detachably coupled directly onto the outside of the terminal body.

Referring back to FIG. 3A, the touch screen formed by the display unit 151 and the touch sensor may recognize a touch input by a pen unit.

As one example, the terminal may process a touch input applied by a pen unit and a touch input applied by a finger in a distinguishing manner. For example, an embodiment in which an input window is not output when the touch input of FIG. 2B is applied by a finger, may also be allowed. Hereinafter, description will be given under an assumption that the same operation is also enabled for a touch input by a finger without employing the distinguishing manner.

Figure 4:
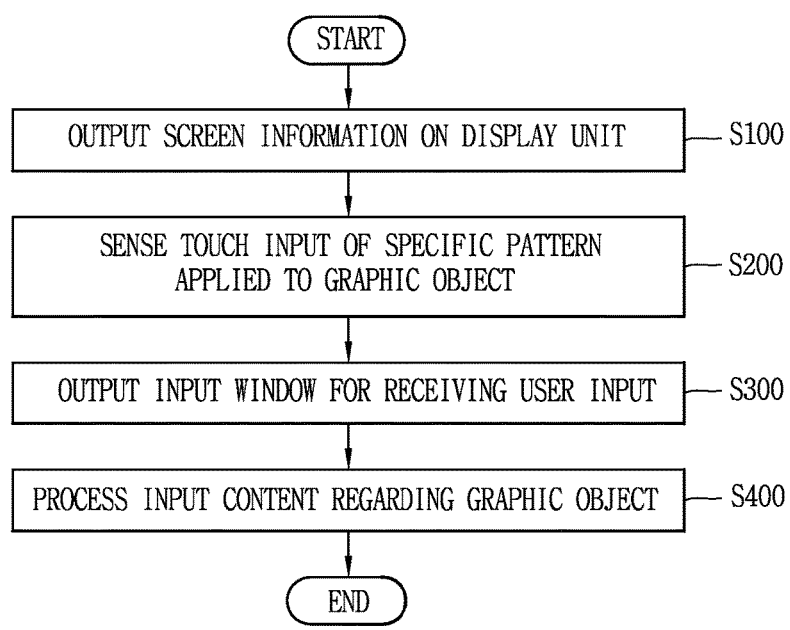
FIG. 4 is a flowchart illustrating a control flow of a user interface implemented by the present disclosure.

FIG. 4 is a flowchart illustrating a control method of a user interface implemented by the present disclosure.

According to the control method, screen information may be output on the display unit (S100). The screen information may be the home screen page, as aforementioned. Or, as another example, the screen information may also be a lock screen in a lock mode, an execution screen of a specific function, an execution screen of an application and the like.

Next, the sensing unit may sense a touch input of a specific pattern, which is applied to a graphic object within the screen information (S200). The sensing unit may be a touch sensor, and configure a touch screen by combination with the display unit. As another example, the sensing unit may be a different type of sensor, such as a ultrasonic sensor, an acceleration sensor, a magnetic sensor and the like, which can sense a touch input applied onto the display unit.

The specific pattern may be set by a user. For example, the specific pattern may be set to a pattern of drawing a circle, a triangle, a rectangle and the like, a pattern of ticking off, a pattern of marking X, and other marks. As another example, the specific pattern may be a pattern of writing text. For example, writing an alphabet, for example, "I," on the graphic object may be set to the specific pattern.

As another example, the specific pattern may differently be set according to each control command. In more detail, a pattern for outputting an input window may be an input generated as the pen unit is moving on a plane outputting the screen information. That is, the specific pattern may be a pattern which is drawn on a plane outputting a screen of the display unit (or an outer surface of a window covering the display unit). Also, a pattern for termination or execution may be set to tapping on the display unit.

As illustrated, the controller may output an input window for receiving a user input when the touch input of the specific pattern is applied (S300). The input window, as aforementioned, may be configured to receive the user input over the entire display unit. As another example, a separate window touched by the user to input a command may be output on a part of the display unit.

Here, when a touch input of a pattern different from the specific pattern is applied onto the graphic object, an application (or a widget, a function of the terminal) related to the graphic object may be executed. For example, when a short touch or a long touch is applied to the graphic object, the application (or the widget or the function of the terminal) may be executed. And, when a gesture (or a touch input) of drawing a circle on the graphic object is applied, the input window may be output.

Whether or not to execute the sensing step (S200) and the outputting step (S300) may be determined according to a point where the pen unit applies the touch input. As another example, different functions may be executed according to touch points.

As another example, the input window may be a virtual input window. The virtual input window denotes an area to which a control command is inputtable into the terminal at a position apart from the terminal. To this end, the pen unit may be configured to transmit and receive wireless signals to and from the terminal.

Finally, the controller may process the content input through the input window regarding the graphic object (S400). As one example, the content input through the input window may be communicated to an application (a widget or a function of the terminal) which is associated with the graphic object. The reflection may denote that the content is processed into data associated with the application, different from the state prior to the input applied, such as being stored regarding the application or being used for executing a function associated with the application.

The processing step (S400), in more detail, may be a step in which the input window disappears and the input content is communicated to the application when a control command indicating the completion of the user input is applied while the input window is output.

For example, the controller of the terminal may recognize the input content, and display the input content on the graphic object by converting the content into information related to the content. If the input content is a date or a mark, the controller may automatically recognize it, and write the date or mark on the application associated with the graphic object.

Hereinafter, various exemplary embodiments of a control method for the user interface will be described in more detail. FIGS. 5 to 15 are conceptual views illustrating user interfaces implemented by the present disclosure.

Figure 5:
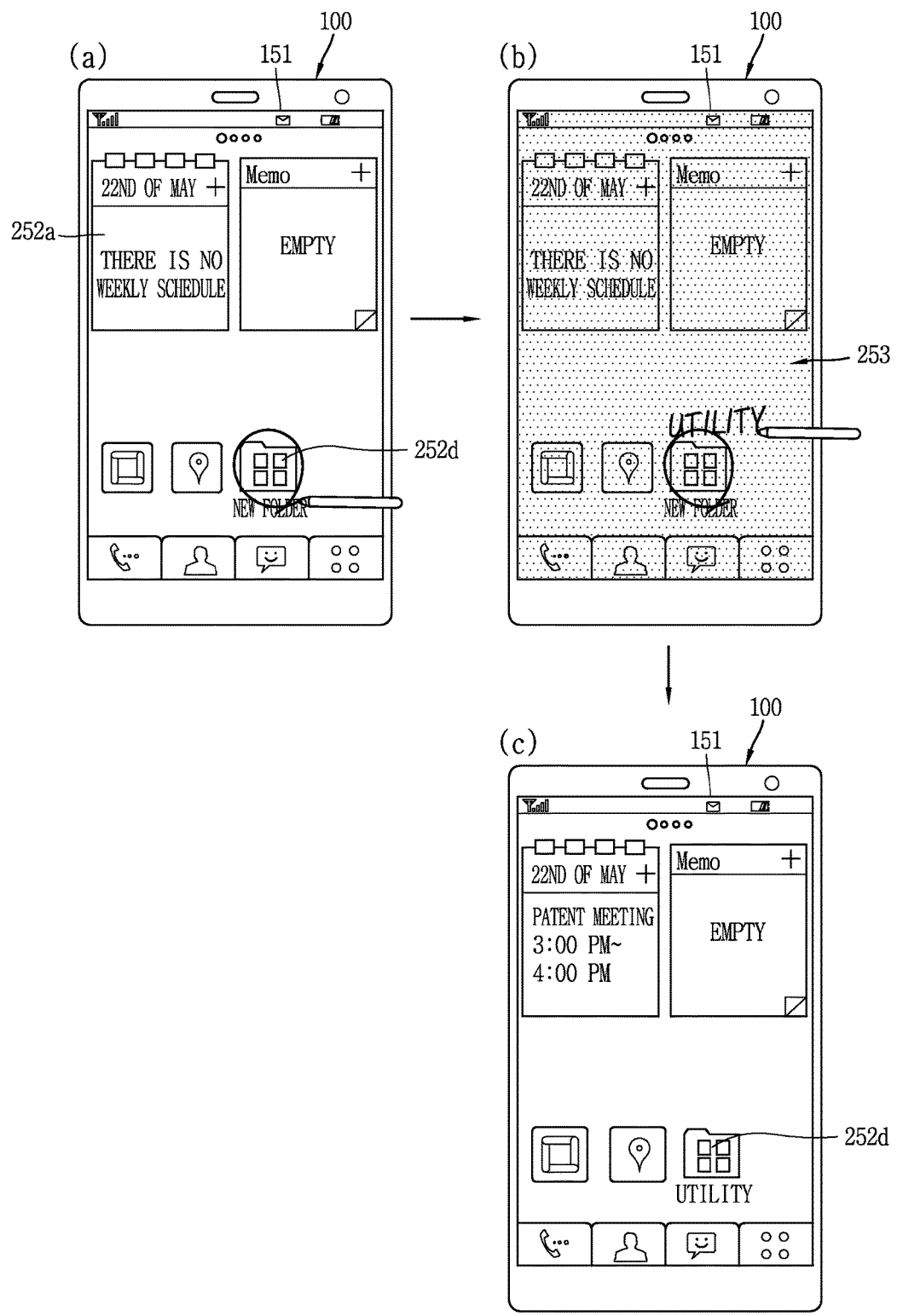
FIGS. 5 to 15 are conceptual views illustrating user interfaces implemented by the present disclosure.
Figure 6:
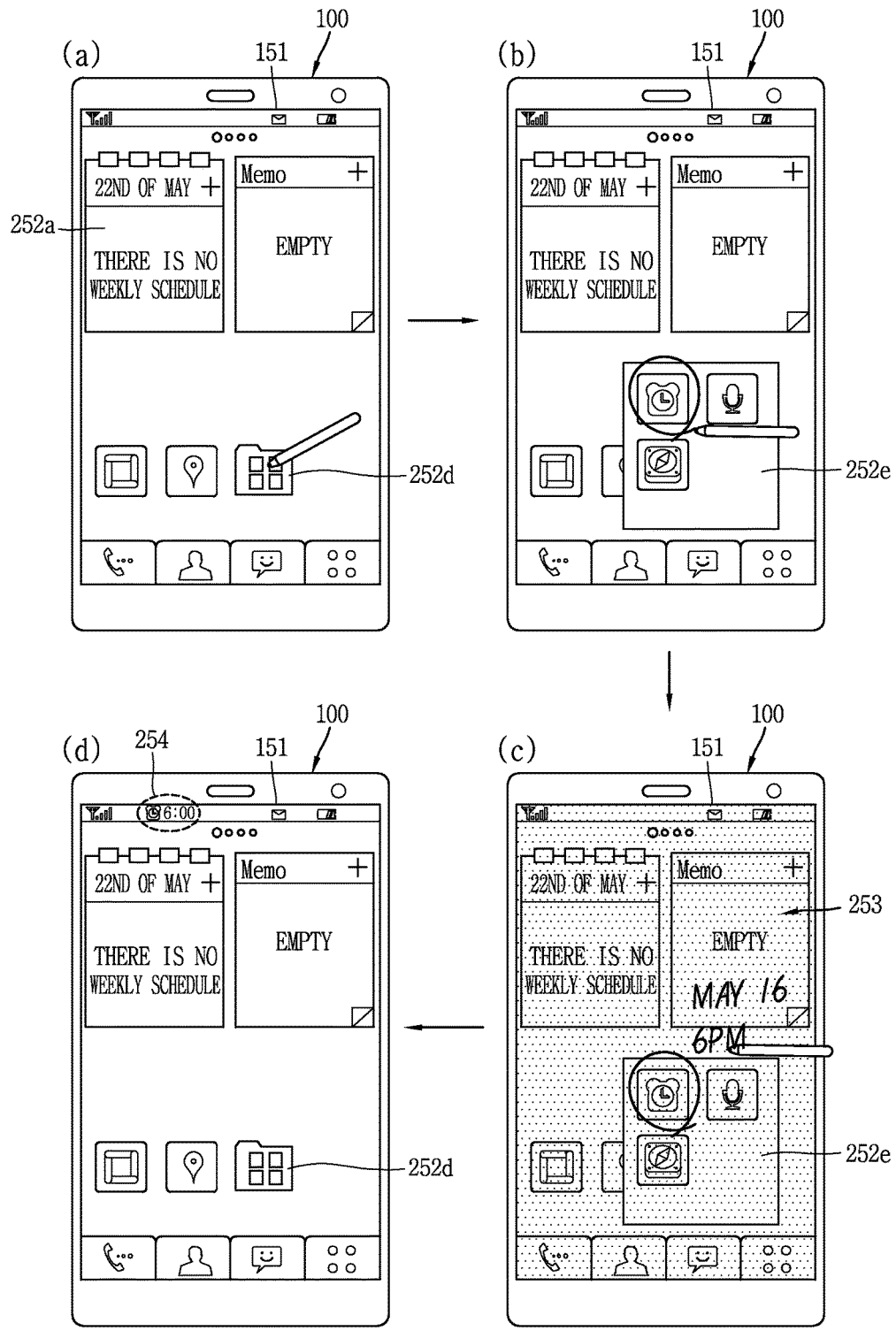

FIGS. 5 and 6 are conceptual views illustrating a control method of executing a different function according to an input point.

As illustrated in FIGS. 5 and 6, the present disclosure may be configured to differently process a content input through the input window according to a type of graphic object to which a touch input of a specific pattern is applied. That is, the aforementioned graphic object may be one of graphic objects output within the screen information, and the contents input regarding the graphic objects may be processed differently according to the types of the graphic objects.

Referring to FIG. 5A, the home screen page of FIG. 2B may be output on the display unit. For example, on the home screen page may be displayed a widget icon 252a and a folder 252d stored with icons of applications.

When a touch input of a specific pattern (a gesture of drawing a circle) is applied to the widget icon 252a on the home screen page, as aforementioned, the input window may be output and those control operations illustrated with reference to FIG. 2B may be executed.

However, when a touch input of a pattern which is different from the touch input of the specific pattern is applied to the folder 252d, an input window 253 for a different input may be output. That is, the shape of the input window 253 may be the same as aforementioned, but processing for the input content may differ.

As one example, referring to FIGS. 5B and 5C, a content input on the input window 253 may be set to a name of the folder 252d. That is, a previous name of a folder may be changed to the content input on the input window 253. In more detail, when the folder name is input and a control command indicating the completion of the user input is applied while the input window 253 is output, the input window 253 may disappear and the name of the folder 252d may be changed.

In this case, the terminal may recognize the content input on the input window as text and process the recognized text as the name of the folder.

As another example, when a touch input of a specific pattern (a gesture of drawing a circle) is applied to a background screen while the home screen page is output, an input window for setting a background screen may be output (not shown). Here, the input window may be an input window which displays images to be set as the background screen in form of thumbnail and is touched by a user to select one of the images.

FIG. 6 is an exemplary variation of the control method of FIG. 5, which illustrates another example of executing a different function according to a type of a graphic object to which the touch input of the specific pattern is applied.

As illustrated in FIG. 6, when a touch input is applied to the folder 252d while the home screen page is output, the display unit may output icons 252e of applications within the folder 252d. The touch input of this case may be a short touch, a long touch or the like, but the present disclosure may not be limited to this. For example, the touch input may also be a touch input with a preset specific pattern.

Afterwards, when the touch input of the specific pattern is applied to one of the output icons 252e, the input window 253 may be output.

For example, when a gesture (or a touch input) of drawing a circle on an icon of an alarm application, the input window 253 may be output. Here, the input window 253 may be manipulated by a user to set an alarm. When the user inputs a date and a time on the input window 253, the alarm may be automatically set without an execution of the alarm application (see a reference numeral 254 of FIG. 6D).

The foregoing embodiment illustrates that the processing of the content input on the input window depends on the type of graphic object to which the touch input of the specific pattern is applied. Hereinafter, description will be given of an embodiment of applying a touch input to a plurality of graphic objects.

Figure 7:
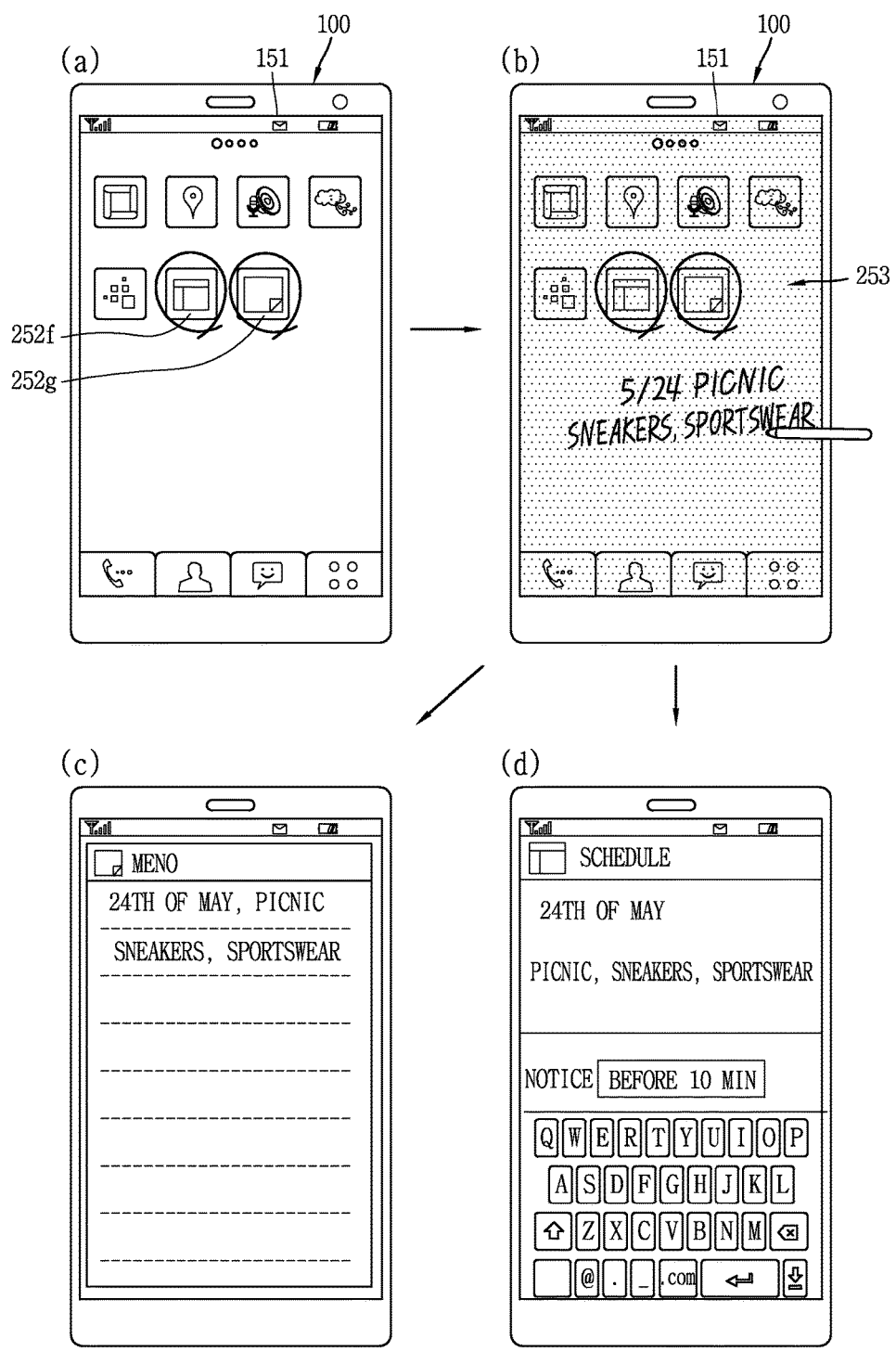
Figure 8:
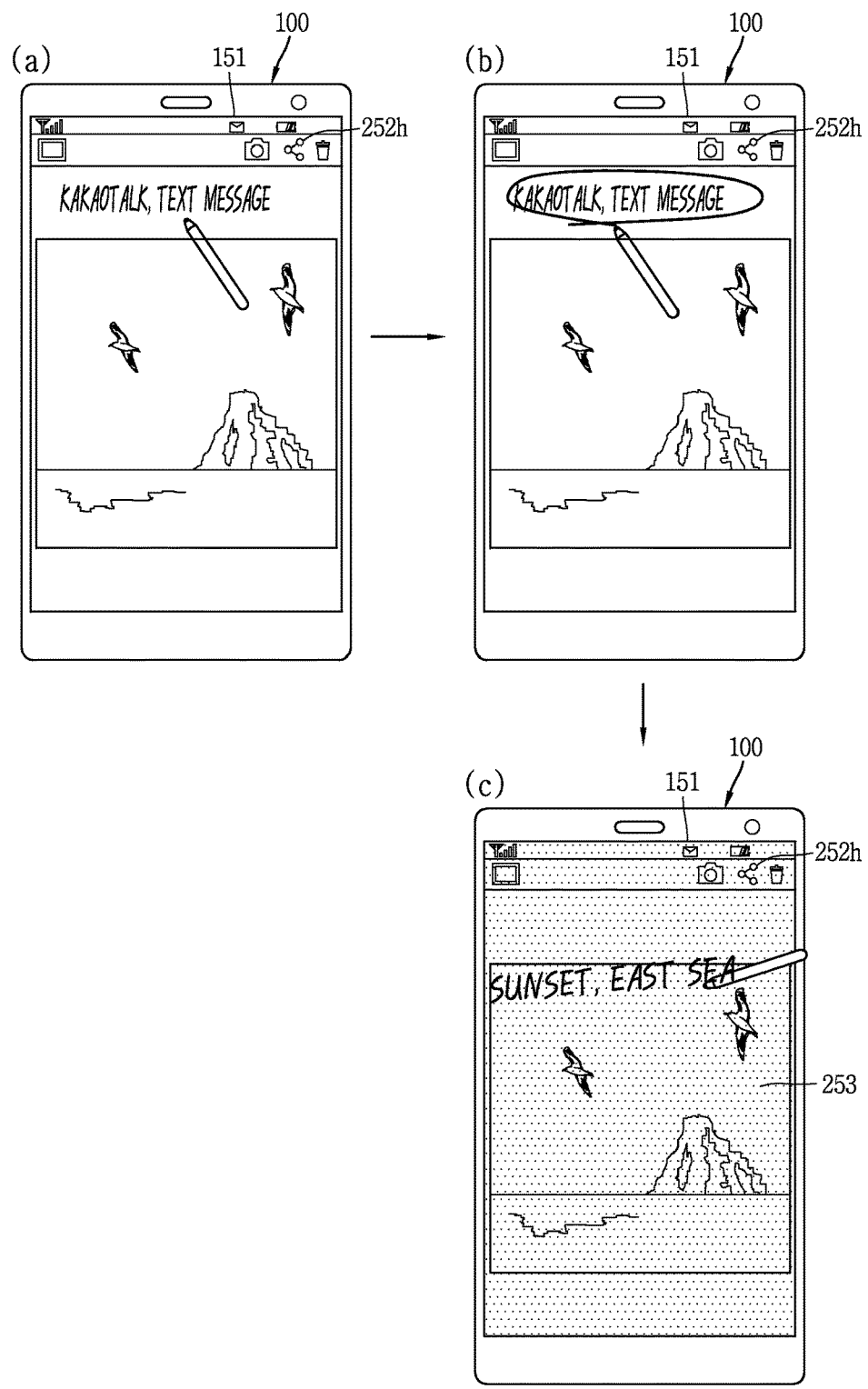

FIGS. 7 and 8 are conceptual views illustrating a control command in case where a touch input of a specific pattern is applied to a plurality of applications.

These drawings exemplarily illustrate a user interface which is simply manipulated by a user when the same event has to be input to a plurality of applications.

Referring to FIG. 7, a plurality of graphic objects may be output on the home screen page. The plurality of graphic objects may be icons of various applications, for example.

When a touch input of a specific pattern is applied to some of the plurality of graphic objects, an input window manipulated by a user to input a content, which is to be communicated to each of applications associated with those touch input-applied graphic objects, may be output.

In more detail, referring to FIG. 7A, a touch input of a specific pattern may be applied to applications in which a schedule is writable. For example, a touch input of a specific pattern may be applied to an icon 252f of a calendar application and an icon 252g of a memo application. The specific pattern may be a pattern of drawing one circle on the screen and right after drawing another circle without taking a pen unit away from the screen. That is, a pattern that a plurality of circles, which are continuously drawn, surround the icons 252f and 252g, respectively, may be set to the specific pattern.

As another example, a pattern in a form of drawing a large circle which simultaneously surrounds both the icons 252f and 252g or a drag input which starts from one of the icons 252f and 252g to the other may be set to the specific pattern.

Next, when the touch input of the specific pattern is applied, the input window 253 may be output, and a content input through the input window 253 may be stored as information related to the same event in the applications. The storage of the information may be executed in response to a touch input of another pattern (for example, tapping) applied onto the input window 253.

As illustrated, when a control command indicating the completion of the user input is applied while the input window is output, the input window may disappear and an execution screen of at least one of the applications may be output. The at least one execution screen may display information indicating the content input through the input window. Here, the present disclosure may not be limited to this. The output of the execution screen may also be omitted.

As a more detailed example, when a date (24$^{th}$ of May) and memo contents (picnic, sneakers, sportswear, etc.) are input on the input window, the date and the memo contents may be changed into input forms corresponding to the applications for storage. In more detail, the date and the memo contents may be stored in a memo form in the memo application, and the memo contents may be stored in the calendar application on the corresponding date.

Although not shown, when a touch input of a specific pattern is applied again while the input window is output, a new input window may be output. In this case, the specific pattern may be the aforementioned specific pattern which has been set to output the input window or a different type of touch pattern, such as a short touch, a long touch and the like. Also, a content input through the new input window may be stored as information in a given application.

As another example, when a touch input is applied to a specific icon while the input window 253 or a new input window is output, a virtual keyboard may be output. When it is difficult to input a content in a writing manner, the content may be input using the virtual keyboard, and the input content may be displayed on the input window (or another input window which is output along with the virtual keyboard). The content input through the virtual keyboard may also be stored as information in a given application.

Also, information related to the same event may include a captured image of the input window. In more detail, a specific portion of the input window, on which the content has been input, may be stored as a memo image. The memo image may correspond to a part or all of the input window. For corresponding to the part, an area which includes every input content may be stored as an image. Also, in this case, the image may be selectively stored according to a user's setting.

The foregoing embodiment exemplarily illustrate that the touch input of the specific pattern is applied to the icons corresponding to the plurality of applications. However, a plurality of virtual buttons may also be simply set in a duplicating manner through the same process, so as to allow for executing the input operation and the simultaneous storage.

Another example of executing a plurality of events on an execution screen of an application will be described.

Referring to FIG. 8A, an execution screen of a gallery application may be output on the display unit 151. The execution screen may output a share button 252h along with an image. Here, when the user selects the share button 252h, icons of applications to which the image is to be transmitted may be output.

Referring to FIGS. 8B and 8C, when a touch input of a specific pattern is applied to a plurality of icons of those icons, an input window 253 allowing a user to input a memo may be output on the image.

After the user inputs the memo on the input window 253, when a control command indicating the completion is applied, the memo-input image may be transmitted to another party through applications (a messenger application and a text message application in this example) corresponding to the plurality of icons.

Here, this example may not be limited to the simultaneous touch input to the plurality of applications. For example, when the touch input of the specific pattern is applied to one of the icons of the applications, an image which stores a memo in association with the one application may be transmitted.

In this manner, the present disclosure may be applied even while an application is executed, thereby improving user convenience. Hereinafter, description will be given of another example of briefly inputting information (data, content) while an application is executed.

Figure 9:
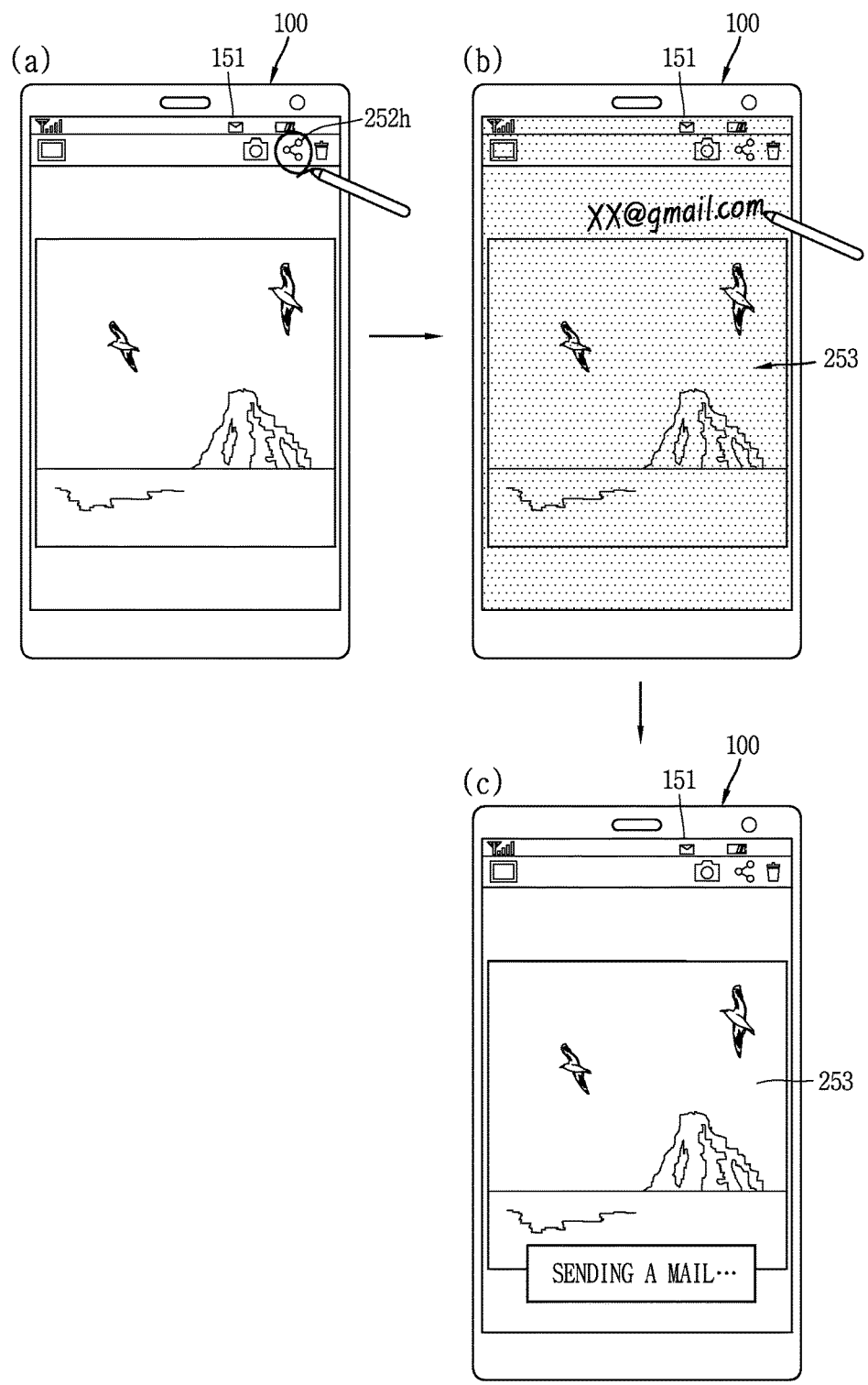

FIG. 9 is a conceptual view illustrating a control method when a touch input of a specific pattern is applied within an execution screen of a specific application.

Referring to FIG. 9, when a touch input of a specific pattern is applied to a graphic object within screen information, an input window 253 for receiving a user input may be output, and a content input through the input window 253 may be processed regarding the graphic object.

Here, in case where at least part of the content input through the input window 253 is information related to contact information, when a control command indicating the completion of the user input is applied, at least part of the screen information which is kept as output may be transmitted to the one or more contacts represented by the contact information. That is, a detailed option which is input using the pen unit may be an input of contact information and a transmission command.

As a more detailed example, referring to FIG. 9A, an execution screen of a gallery application may be output on the display unit 151. A share button 252*h* may be output on the execution screen together with one image stored in a gallery.

Here, when the user applies a touch input of a specific pattern to the share button 252*h*, an input window 253 may be output, as illustrated in FIG. 9B. The touch input of the specific pattern may be a gesture (or a touch input) of drawing a circle, for example. Even in this case, at least part of the image may be continuously output such that the user can recognize the image even while the input window 253 is output.

As illustrated, when the information related to the contact information is input into the content which is input on the input window 253, the controller may automatically detect and recognize it. To this end, the controller may check whether or not the contact information is present in the content input. The information related to the contact information may be an email address, a telephone number and the like.

In accordance with this exemplary embodiment, after the email address is input, when a control command indicating the complete input is applied, the image may be transmitted to the contact information (see FIG. 9C).

As another example, at least part of the screen information which is kept output may be stored together with the content input through the input window. That is, another memo which is stored in association with the image may be input on the input window together with the contact information. Here, when a control command indicating the completion of the user input is applied, both the image and the input memo may be transmitted to the contact information. To execute such function, the controller may execute a process of sorting the input content into the contact information and the memo.

As another example, a plurality of contact information may be input on the input window. Here, the image (or the image and the memo) may be transmitted to each of the plurality of contact information. This example may be configured to output a check window for checking the plurality of contact information in order to prevent an erroneous operation. The check window may allow the user to select contact information. Accordingly, the image may be transmitted to the user-selected contact information in a touching manner or the like.

In this manner, the user may input contact information immediately after drawing a circle on a button for inputting detailed information, on an execution screen of a specific application.

Figure 10:
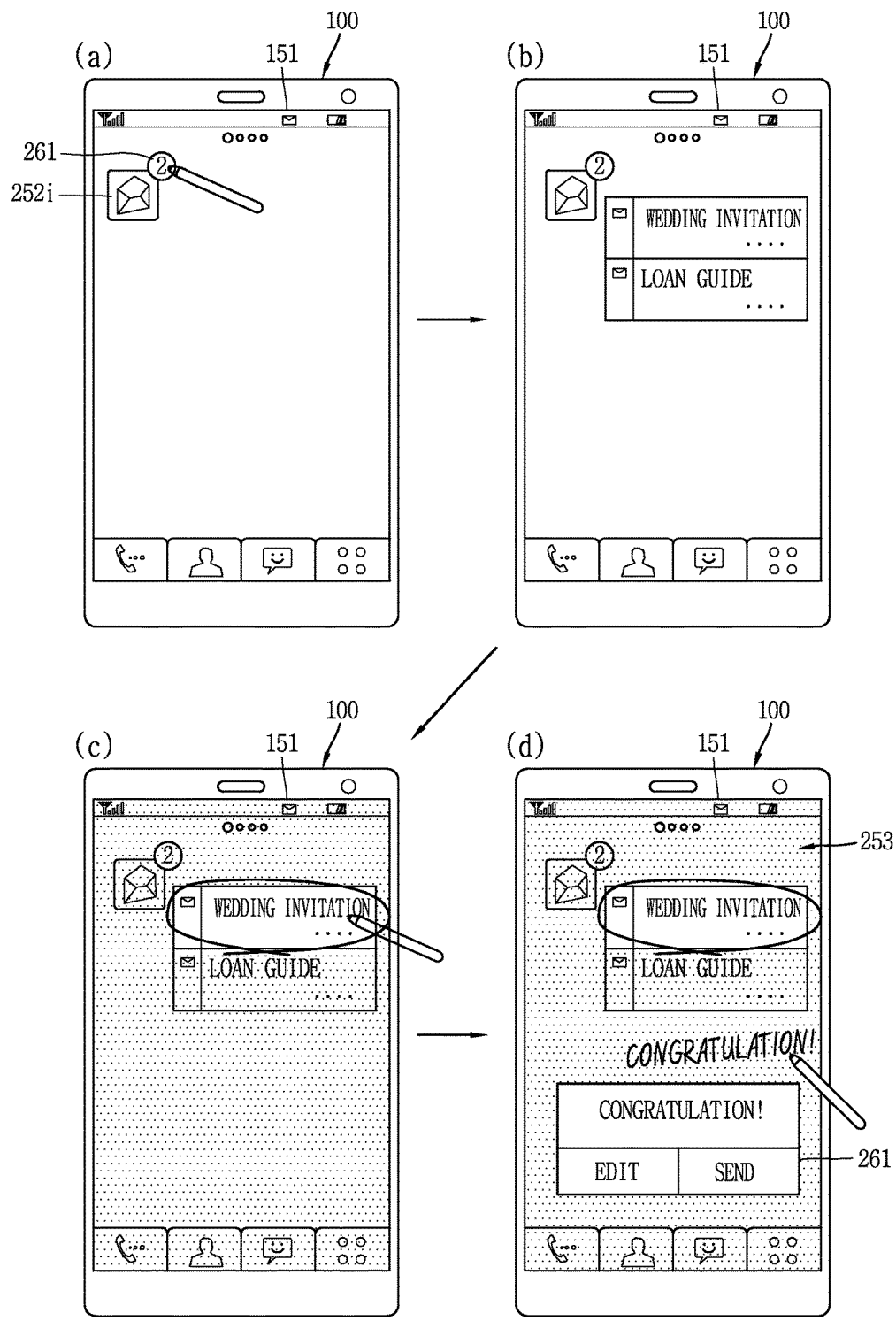
Figure 11:
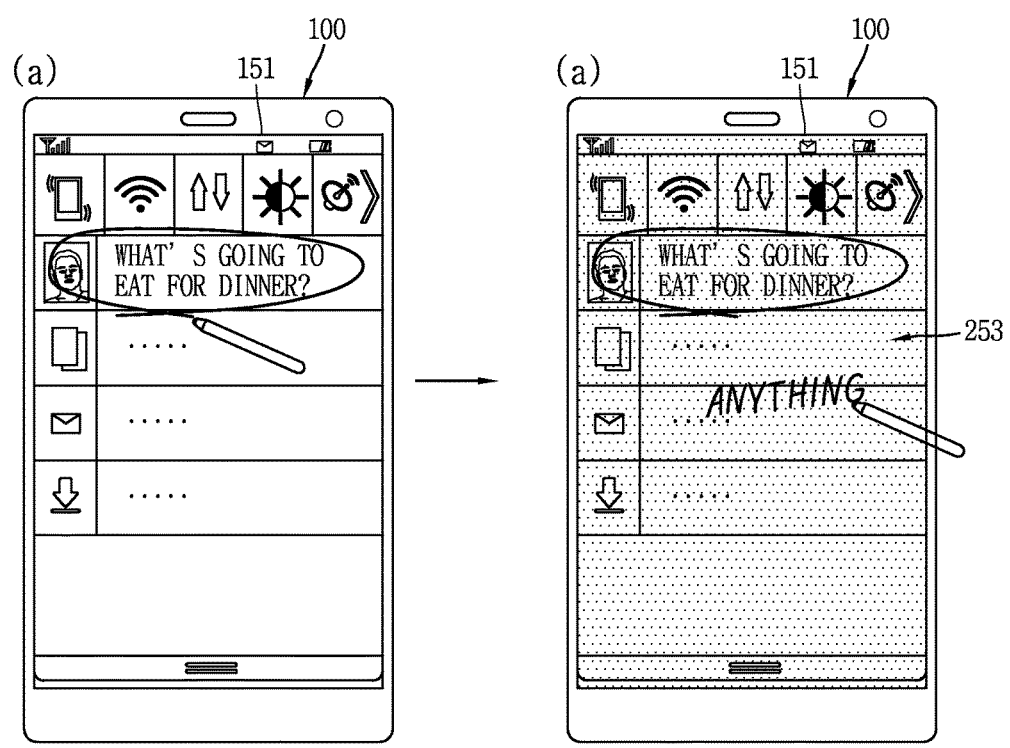

Also, the present disclosure may also be applied to a case of responding to various notifications (notices, indications). FIGS. 10 and 11 are conceptual views illustrating a control method applied to a case of responding to a notification.

Referring to FIG. 10, a graphic object as a target to receive a touch input of a specific pattern thereon may be a notification window for a received message, and a content input through the notification window may be transmitted as a response to the message.

For example, when an event is generated from at least one application, the controller may output an indicator 261 for notifying the event generation on an icon 252*i* of the event-generated application. Here, the home screen page which is being output on the display unit 151 is merely illustrative. The display unit 151 may output a graphic user interface (GUI) of a currently-executed application, and in this state, the event may be generated.

In accordance with this example, the indicator 261 may indicate an arrival of a message. When the user applies a touch input (for example, a short touch or a long touch) to the indicator 261, the controller may output information related to the event. The event-related information may be at least part of the content of the message, and this may be output in a preview form (see FIG. 10B). Also, as illustrated, the previews may be scrollable.

When the user applies the touch input of the specific pattern (for example, a gesture of drawing a circle) to at least one of the previewed information, the input window 253 may be output as illustrated in FIGS. 10C and 10D. In accordance with this example, the graphic object may be an image (a notification window or a preview image) which is output on the display unit in response to the touch input applied to the icon displayed on the display unit.

When a content to be transmitted is input on the input window 253 in a writing manner or through a virtual keyboard and a control command (for example, tapping) indicating the completed input is applied, the content to be transmitted may be transmitted as a response to the message. Here, a popup window 261 may be output to check the content to be transmitted. The popup window 261 may allow the user to select a message edition or a message transmission.

For example, when the user selects the message edition, the input window 253 may be converted into an edit mode to edit the message. Upon the conversion, a toast message "edit mode" may be output on the display unit and then the input characters may be individually highlighted. As an example of the highlighting, an area selected on the individual basis may be limited by a boundary line or differently shaded and displayed. In this case, in the edit mode, a virtual keyboard may be output to facilitate for message edition on the individual basis.

In accordance with the embodiment, the user may simply response to a notification, irrespective of a current condition, such as a home screen page, an executed state of an application, or the like. That is, the user may also response to or control a popup or a notification, provided within a screen, in a manner of drawing a circle.

Referring to FIG. 11, even when an event is generated from a specific function of the terminal, other than an application, the content input through the input window may be processed as a response to the event. In this example, a graphic object as a target to receive a touch input of a specific pattern may be a notification item generated on a status bar (a status display window, an indicator window, or the like), and the content input through the input window may be transmitted in response to the message.

In more detail, referring to FIG. 11A, when a message is arrived, for example, a notification item may be generated on a status display window. At least part of the received message may be displayed on the notification item.

Here, the status display window may be output on the display unit only when the user requests for outputting the window. As one example, when a drag touch input, starting from a preset area on the display unit, is sensed, the controller 180 may determine it as a reception of the user's output request for the status display window.

Referring to FIG. 11B, when the user applies a touch input of a specific pattern (for example, a gesture of drawing a circle) to the notification item, the input window 253 may be output. When the user inputs a response to the received message on the input window 253 and applies a control command (for example, tapping) indicating the completion, the response may be transmitted in response to the message.

In this manner, the present disclosure may facilitate the message transmission while the status bar (or the status display window or an indicator window) is output, without an execution of an application. Here, this embodiment may not be limited to the message transmission. For example, when the notification item is an item notifying a schedule, a content input through the input window, as aforementioned, may be communicated to the calendar application.

Figure 12:
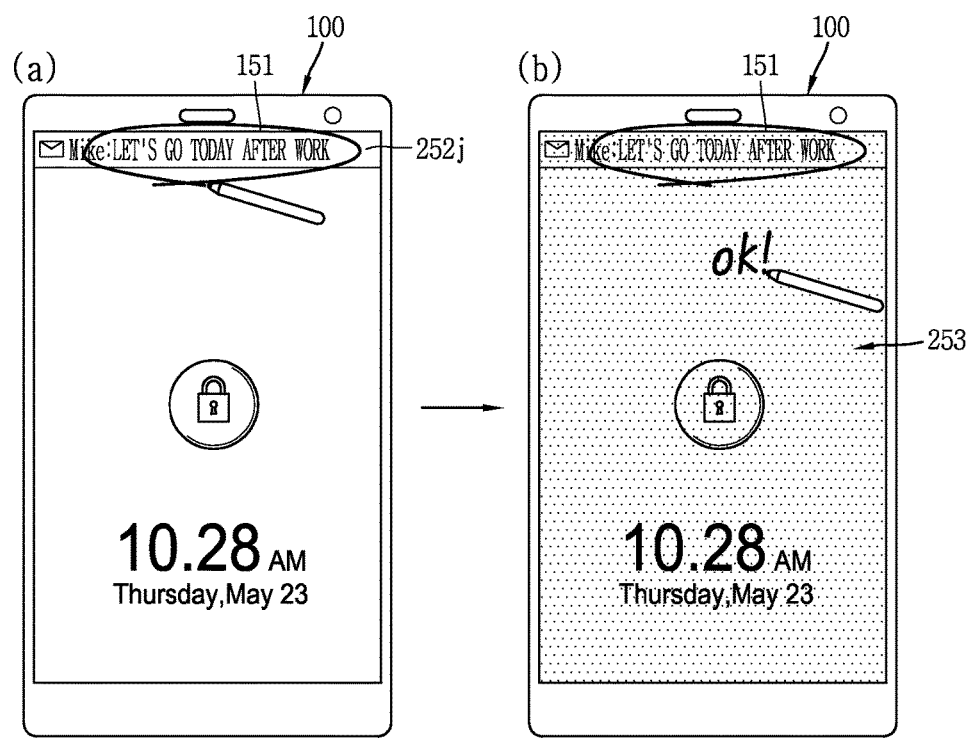

Also, the present disclosure may provide a user interface by which a brief response to a notification can be allowed even in a lock mode. FIG. 12 is a conceptual view illustrating a control method when a touch input of a specific pattern is applied onto a lock screen in a lock mode.

In this example, a graphic object as a target to receive the touch input of the specific pattern may be displayed on the lock screen which is output in the lock mode.

FIG. 12A illustrates the lock mode, in which a touch input with respect to at least part of the display unit 151 is limited. For example, the lock mode may be a state in which only a touch input relating to a release of a lock state is allowed.

The lock screen may be output when a user's control command is input in a deactivated state of the display unit 151. If a message is received in the lock mode or the deactivated state of the display unit 151, a notification image 252j, which notifies the reception of the message, may be output on an upper area of the lock screen (for example, a status display bar area, a status display area or a status bar). The notification image 252j may include an icon indicating the message reception and a part of the message.

Referring to FIGS. 12A and 12B, when a touch input of a specific pattern is applied to the notification image 252j, the input window 253 may be output. In more detail, when a gesture of drawing a circle is applied to the upper area of the lock screen where the notification image 252j is output, the input window 253 may be popped up in the lock mode. That is, the graphic object as the target to receive the touch input of the specific pattern may be the notification image which is displayed on the lock screen when the message is received.

Here, the popped-up input window 253 may be a new layer with the lock screen as a background. Thus, the output state of the input window 253 may be defined as an input mode. When a control command indicating the completion of the user input is applied in the input mode, the input window may disappear and the lock screen may be output again. That is, in response to the control command, the input mode may be converted back into the lock mode. Here, the content input through the input window 253 may be transmitted in response to the message.

As such, the present disclosure may allow the control command to be simply input without releasing the lock mode to access a new window.

In the meantime, the mobile terminal according to the present disclosure may receive an event even when it is not in the lock mode, and execute the aforementioned operations based on the touch input of the specific pattern sensed while the received event is displayed on the status display bar.

The present disclosure may have an advantageous effect in that a remote screen can also be simply controlled by use of a pen unit. Hereinafter, it will be described.

Figure 13:
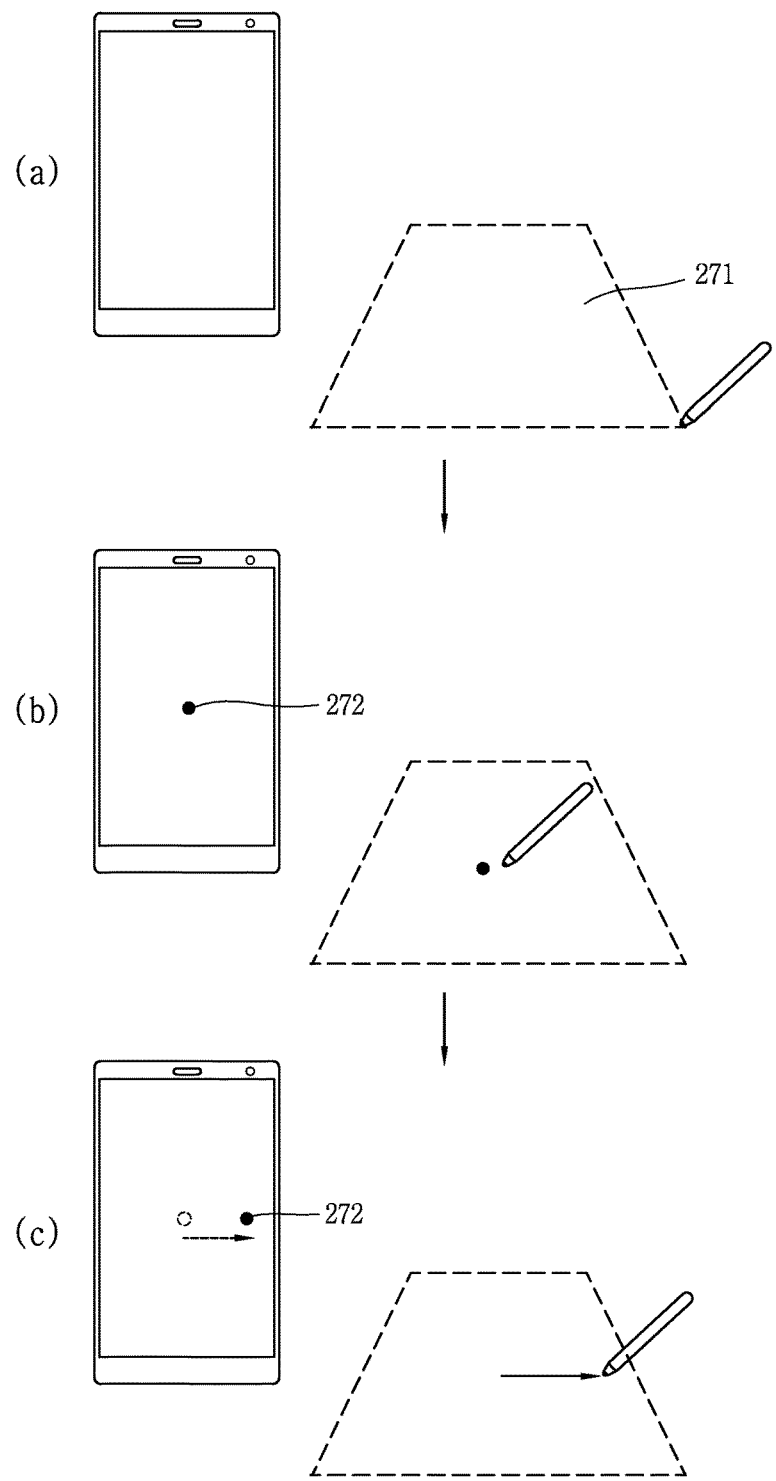

FIG. 13 is a conceptual view illustrating a method of setting a control area using a pen unit.

Referring to FIG. 13, the mobile terminal may receive the content, which is input by the user using the pen unit at a position apart from the mobile terminal. The mobile terminal may display the input content on the display unit 151. The sensing of the input may be achieved by transmission and reception of a wireless signal between the mobile terminal and the pen unit.

The position apart from the mobile terminal where the input by the pen unit is sensible may form a virtual control area 271. As illustrated, the control area 271 may be set by the user. That is, the control area 271 may be formed by randomly defining a size of the control area 271 using the pen unit.

For example, the control area 271 may be formed based on a plurality of points set using the pen unit. The plurality of points may be two vertexes, facing each other, of the control area 271 formed in a shape of a right-angle square. As another example, the plurality of points, as illustrated, may be four vertexes of the control area 271. This may allow the user to arbitrarily set size and position of the control area 271.

Referring to 13B, when the control area 271 is set, a pointing 272 of the pen unit within the control area 271 may be displayed on the display unit of the terminal. The user may recognize the point which matches a position of the pen unit based on the pointing 272, and accordingly control a screen, which is located apart, as illustrated in FIG. 13C.

Figure 14:
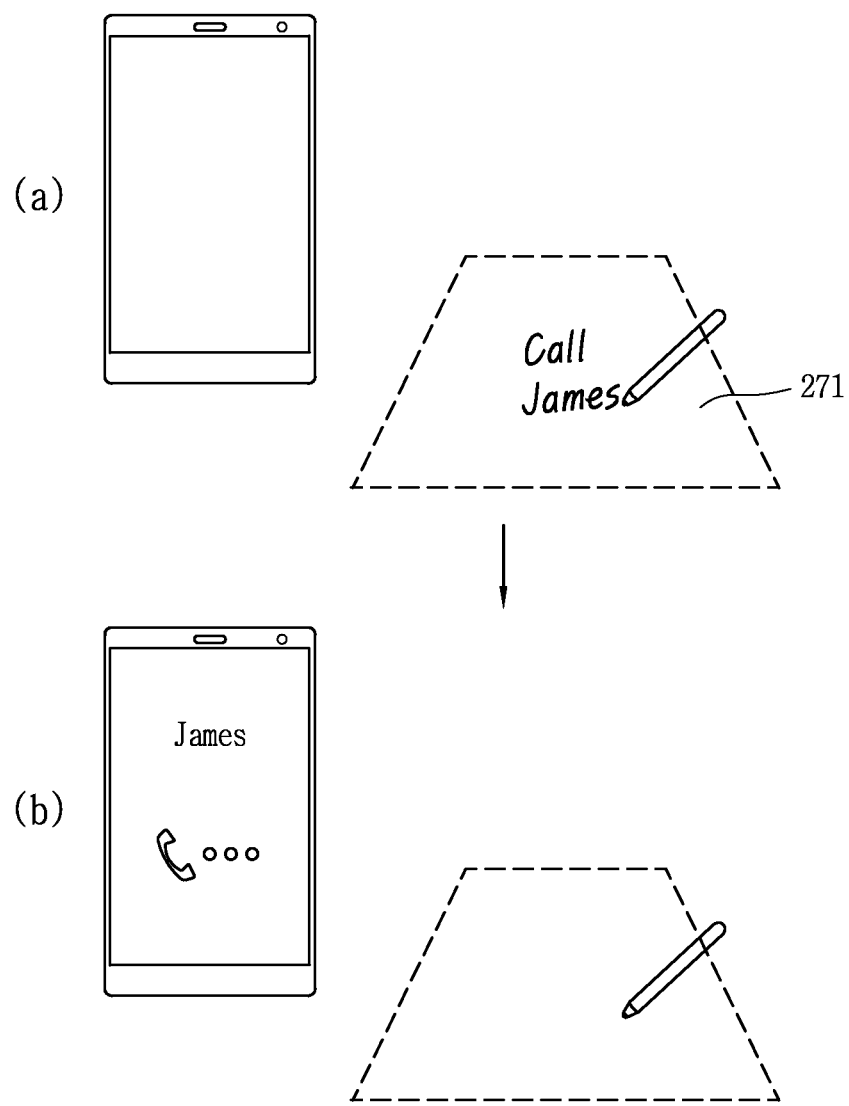
Figure 15:
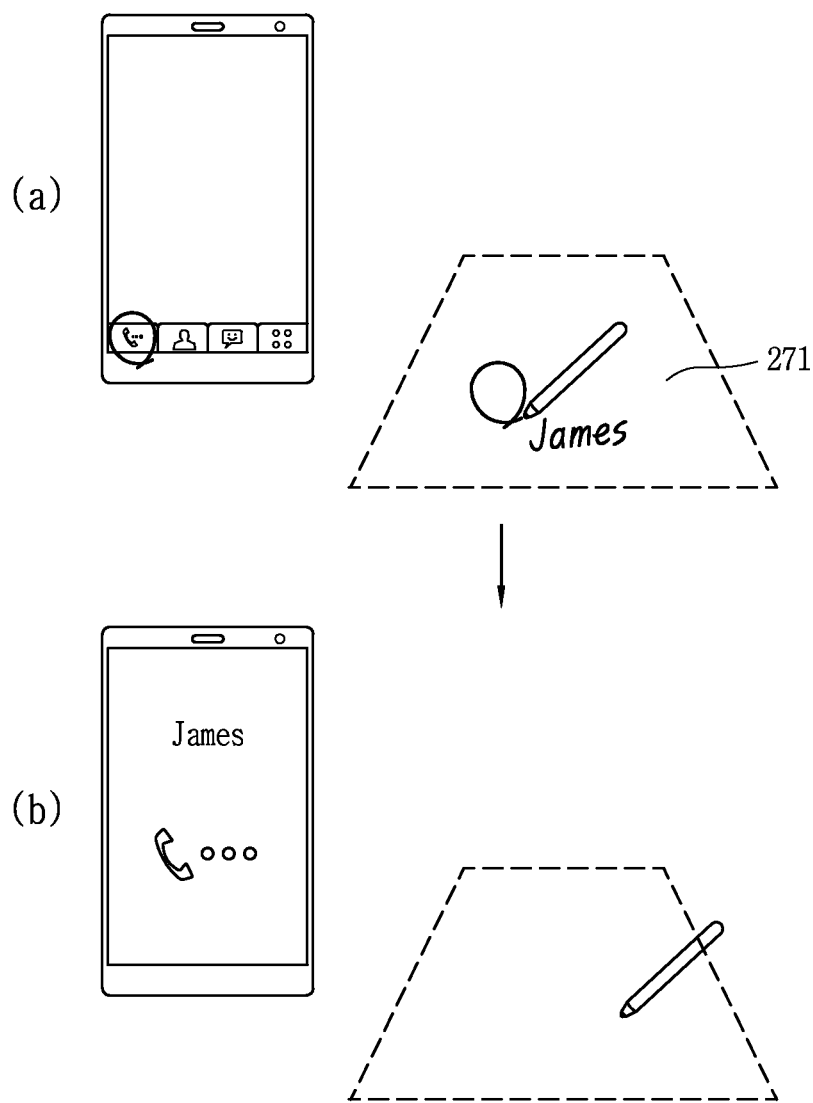

FIGS. 14 and 15 are conceptual views illustrating a method of immediately executing a desired operation on a screen using a pen unit.

Referring to FIG. 14, the mobile terminal may receive a content input within the control area 271 and analyze the received content. When the input content includes a control command, the terminal may execute the control command. For example, as illustrated, when a text, for example, 'call' which represents call placing is input on the control area 271, the terminal may detect it and execute the call placing.

Also, when the input content includes information related to the control command, the terminal may detect it and process it regarding the control command. For example, when information (for example, contact information, name, etc.) related to another party is input together with the 'call,' the terminal may recognize the another party and perform placing the call to the another party. As another example, when the call is placed according to the method, an automatic setting to a speaker phone may also be available.

The control operation may be combined with the aforementioned control method. For example, referring to FIG. 15, when a touch input of a specific pattern (for example, a gesture of drawing a circle) is applied to a position corresponding to a call placing icon within the control area 271, the control area 271 may be set to an input window. A content input on the input window may be processed regarding the call placing icon. That is, a graphic object as a target to receive the touch input of the specific pattern may be an icon output on the terminal or the like, but the touch input of the specific pattern may be applied to the control area 271.

The input window which is a virtual input window may be set within the control area 271. When a control command (for example, tapping) indicating the input completion is applied onto the control area 271, the input content may be processed. For example, when information (contact information, name, etc.) related to another party is input within the control area 271, a call may be placed to the another party. For hanging up, a gesture corresponding to the hanging up may be applied to the control area 271.

The example may be varied into various forms. For example, when a name of application is input within the control area 271, a virtual input window, which can be manipulated by the user to input a content in the application, may be set within the control area 271. As another example, when a touch input of a specific pattern is applied to a notification message output on the terminal using the control area 271, the virtual input window may be set within the control area 271.

Also, utilizing this example, a conference call may also be executed. In more detail, if another party is added after inputting information (contact information, namely, etc.) related to the another party and a text, which represents call placing, the call placing to a plurality of another parties may be executed. The plurality of another parties may be added by inputting a symbol corresponding to an addition, such as '+.'

As described above, according to the present disclosure, an input window may be output in response to touching a graphic object, and an input content may be processed regarding the graphic object, whereby a user can briefly respond to each event generated from a mobile terminal. This may result in implementing a new type of user interface relating to an input operation.

Also, tasks such as inputting and the like may be simply executed without executing an application in the mobile terminal.

A touch input applied by a pen unit and a touch input applied by a finger may be distinguished from each other, which may bring about a reduction of a user's erroneous input, resulting in improvement of user convenience.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a touch screen that outputs a home screen page comprising a plurality of icons corresponding to applications;
   a controller that:
   receives a first touch input having a predetermined pattern and applied to a first icon of a first application among the plurality of icons corresponding to the applications,
   wherein if the first touch input has a first predetermined touch pattern, the controller executes the first application and controls the touch screen to display the executed screen of the first application,
   wherein if the first touch input has a second predetermined touch pattern, the controller controls the touch screen to display the input window for receiving a control command to be processed associated with the application in a state where the home screen page is displayed on the touch screen,
   wherein the first application, with which a command associated with a handwritten touch input is executed, is selected when the first touch input having the second predetermined touch pattern is applied to the first icon,
   wherein the input window is displayed on the touch screen in an overlapped manner such that at least part of the home screen page is continuously visible through the input window,
   wherein when the handwritten touch input applied to the input window, the controller executes the command, associated with the handwritten touch input, with the first application in the state of where the home screen page is displayed on the touch screen, and
   wherein the executed screen of the first application is not displayed during executing the command, associated with the handwritten touch input, with the first application.

2. The terminal of claim 1, wherein the first touch input and the handwritten touch input are applied by a pen unit.

3. The terminal of claim 2, wherein a movement of the first touch input correlates to a movement of the pen unit on a plane outputting the home screen page.

4. The terminal of claim 1, wherein the at least part of the home screen page forms a background of the input window, and
   wherein the input window disappears and the content is stored when a control command indicating the completion of receiving the handwritten touch input is received.

5. The terminal of claim 4, wherein the control command is applied by a tapping operation of consecutively tapping the touch screen.

6. The terminal of claim 1, wherein the controller recognizes the content and converts the content into information related to content to display on the first icon of the first application.

7. The terminal of claim 1, wherein the first touch input having the second predetermined touch pattern correlates to a movement of the first touch input on a plane outputting the home screen page.

8. The terminal of claim 1, wherein the second predetermined touch pattern is set by the user.

9. The terminal of claim 1, wherein the command corresponding to the handwritten touch input applied to the input window comprises:
   processing content corresponding to the handwritten touch input with the selected first application corresponding to the first icon such that the content is processed differently according to a type of the selected first application.

10. The terminal of claim 1, wherein the command corresponding to the handwritten touch input applied to the input window comprises:
    processing content corresponding to the handwritten touch input with the selected first application corresponding to the first icon,
    wherein the first icon is a notification window associated with a received message, and
    wherein the content corresponding to the handwritten touch input is transmitted in response to the received message.

11. The terminal of claim 1, wherein when at least a portion of content corresponding to the handwritten touch input applied to the input window is information related to contact information, the at least part of the home screen page which is continuously visible is transmitted to one or more contacts represented by the contact information.

12. The terminal of claim 11, wherein the at least part of the home screen page which is continuously visible is stored together with the content corresponding to the handwritten touch input applied to the input window.

13. The terminal of claim 1, wherein the first application is not executed until the handwritten touch input is applied to the input window.

* * * * *